United States Patent [19]

Schaefer

[11] 4,220,406
[45] Sep. 2, 1980

[54] OPTICAL ELECTRONIC FOCUSING DEVICE

[75] Inventor: Klaus-Dieter Schaefer, Braunfels, Fed. Rep. of Germany

[73] Assignee: Ernst Leitz Wetzlar GmbH, Wetzlar, Fed. Rep. of Germany

[21] Appl. No.: 968,133

[22] Filed: Dec. 11, 1978

[30] Foreign Application Priority Data

Dec. 21, 1977 [DE] Fed. Rep. of Germany ....... 2756954

[51] Int. Cl.² .............................................. G03B 7/08
[52] U.S. Cl. ........................................ 354/25; 354/31
[58] Field of Search ................................... 354/25, 31

[56] References Cited

U.S. PATENT DOCUMENTS

| 3,270,647 | 9/1966 | Jokob et al. ........................... 354/25 |
| 4,047,022 | 9/1977 | Holle ..................................... 354/25 |

Primary Examiner—L. T. Hix
Assistant Examiner—Thomas H. Tarcza
Attorney, Agent, or Firm—Schwartz, Jeffery, Schwaab, Mack, Blumenthal & Koch

[57] ABSTRACT

An optical electronic device such as a photographic camera having an objective optical system for forming two images of the same object laterally offset with respect to each other, and a photoelectric receiving device receiving the offset signals. The photoelectric receiving device includes a pair of individual photoelectric receivers upon each of which one of the images of the object is incident. The individual receivers have approximately equal receiving areas which uniformly increase laterally from one side to the other and each receiver provides electrical output signals to an electronic difference circuit.

7 Claims, 8 Drawing Figures

4,220,406

OPTICAL ELECTRONIC FOCUSING DEVICE

BACKGROUND OF THE INVENTION

The invention concerns an optical electronic device for the focusing of objective lenses, especially in photographic cameras.

DESCRIPTION OF THE PRIOR ART

Devices of this type are already known. They are based generally on the electronic comparison of two images of the same object. The two images are displaced with respect to each other laterally in the unfocused setting of the objective. The displacement is the result either of imaging over different pupillary areas or of triangulation by means of a base rangefinder.

It is a disadvantage of prior art devices that a raster grating or even a deflecting mirror both performing a scanning motion must necessarily be present. At least one moving structural element is accordingly required.

Thus, for example, a device is known wherein the relative position of two images is determined by projecting each of the images onto an arrangement of strip-like photoelectric receivers and comparing the signals of corresponding receiver strips in pairs with each other, whereby the total deviation is given by the quantitative summation of all of the partial deviations (DT-PS No. 1 263 325 or U.S. Pat. No. 3,529,528). However, this device has the disadvantage that focusing becomes increasingly inaccurate as an inverse function of the number of receivers and as a function of the area of the individual strip-like receivers. For technical reasons it is not possible to provide an adequate number of receivers. In addition, extremely high requirements as to the uniformity of the strip-like receivers that must be maintained. As a result, the rejection rate of the semiconductor modules used to fabricate the photoelectric receivers increases exponentially with the number of receivers. The corresponding semiconductor modules therefore either perform with very low accuracy or they are extremely expensive.

SUMMARY OF THE INVENTION

It is the object of the invention to provide an electro-optical focusing device which has no moving structural elements and in addition is capable of operating without the type of strip-like receivers described hereinabove.

The object is attained in keeping with the invention by the fact that the photoelectric receiver device consists of at least one pair of two individual receivers, each exposed to one of the images of the object, said receivers possessing approximately equal receiving surface areas which increase uniformly from one side to the other, that a displacement of the image of the object on them produces a change in the electric signal emitted, that the receivers are arranged approximately unidirectionally with respect to their external form and that the receivers are subsequently connected in series with pairs of electrical means for the formation of the difference of the electric signals.

In case of the exact focusing of the objective this difference of the electric signals is equal to zero. When, on the other hand, the objective is unfocused, a positive or negative signal of greater or lesser magnitude appears at the outlet of the difference generator, so that the direction of the defocusing also becomes apparent.

Even though a device comprising only a single pair of photoelectric receivers of the design indicated hereinabove is entirely adequate for focusing, it is proposed in order to improve the sensitivity and accuracy of the device, to provide two pairs of photoelectric receivers, each with two individual receivers, and to design the receiving surfaces wedge-like and to nest all of the receivers within each other so that the total surface represents a rectangle.

The essential advantage of the device of the invention consists of the fact that only relatively noncritical receivers with large surface areas are employed. Whether these receivers are present in the form of photoelements or photoresistors, is of lesser importance.

The means by which the two images of the object to be projected on the photoelectric receivers, are generated is also immaterial. This may be accomplished, for example, by means of a pair of deflection prisms or by a stationary prismatic grid.

In accordance with the invention, there is provided an optical electronic device for focusing as in a photographic camera having an objective optical system whereby two images of the same object are produced laterally offset with respect to each other and a photoelectric receiving device for receiving said offset images and comprising a first pair of individual photoelectric receivers upon each of which one of the images of the object is incident, said individual receivers having approximately equal receiving areas which uniformly increase laterally from one side to the other, said individual receivers providing electrical output signals and said optical electronic device further comprising means for receiving said electrical output signals.

BRIEF DESCRIPTION OF THE DRAWINGS

In the drawings the invention is represented by several examples of the preferred embodiment wherein.

DETAILED DESCRIPTION OF THE INVENTION

Figure 1:
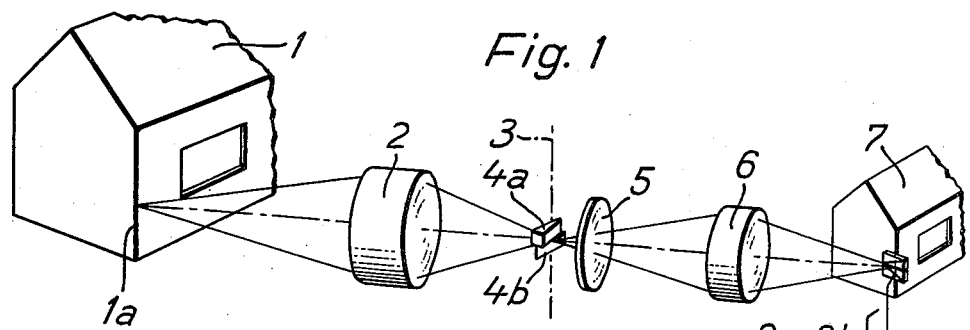
FIG. 1 shows diagrammatically a first embodiment of the invention, wherein the two images of the object are produced by means of two measuring wedges.

In FIG. 1, the symbol 1 designates an object having one of its edges measured by means of an objective lens 2. The objective lens 2 reproduces the edge in an image plane 3 in which two measuring wedges 4a and 4b are arranged. The image of the object is then reproduced in an intercept plane 7 by means of a field lens 5 and an auxiliary optical device 6, with two pairs of photoelectric receivers 8a, 8b and 9a, 9b, being arranged in the intercept plane.

In the process, in a known manner, the parts of the image that are incident on the measuring wedges 4a, 4b are not deflected laterally in the intercept plane 7 when the image plane 3 actually coincides with the plane of the measuring wedges, i.e. when the objective is focused correctly. In all other cases, the partial images of the edge appear in the range of the wedges in the intercept plane 7 and thus on the photoelectric receivers 8a, 8b and 9a, 9b, in positions displaced laterally with respect to each other.

Figure 2:
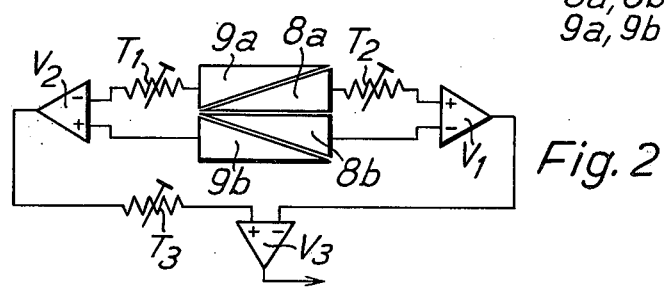
FIG. 2 represents the receiver device in a top view and its associated circuitry.

The photoelectric receivers 8a, 8b and 9a, 9b are of the form shown in FIG. 2. The receiving area of each individual receiver increases from one side to the other (wedge shape), whereby the direction wherein the areas become larger are mutually aligned within a pair (for example, 8a, 8b or 9a, 9b), but differ between pairs (8 and 9).

A difference amplifier $V_1$ and $V_2$, respectively, is placed in series after each pair, the outputs of said amplifiers being connected with a third difference amplifier $V_3$. In addition, trim resistances $T_1$-$T_3$ are inserted in the individual branches.

Figure 3A:
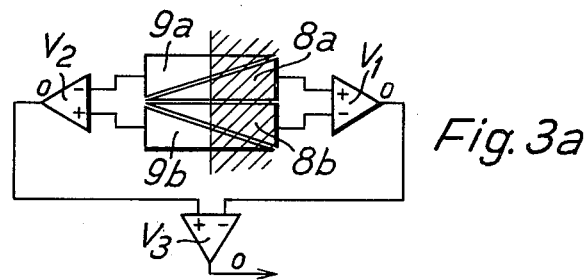
FIGS. 3a–3c are schematic diagrams of three focusing states with the resulting electronic signals.

The device functions in the following manner:

In case of exact focusing the image of the edge 1a progresses without interruption from top to bottom (FIG. 3a). The four receiver segments 8a, 8b and 9a, 9b generate a certain current, the absolute magnitude thereof depending on the general brightness, but being equal for the receivers 8a, 9a/8b, 9b, associated respectively with the upper and lower parts of the image. The difference amplifiers $V_1$ and $V_2$ therefore emit a zero signal at their outputs, which also results in a zero signal at the output of the third amplifier $V_3$.

Figure 3B:
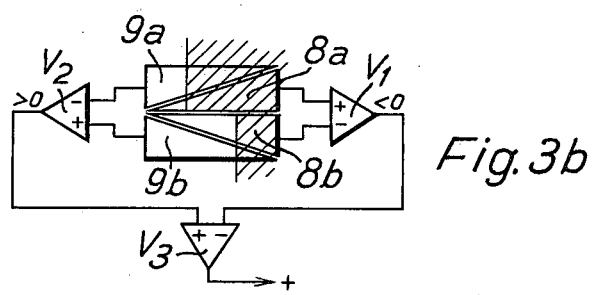
Figure 3C:
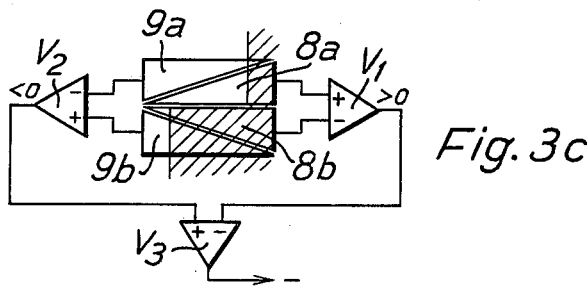

In the unfocused state, the two partial images are displaced laterally with respect to each other, in a manner known in itself. The signals at the inputs of the two difference amplifiers $V_1$, $V_2$ are thus no longer equal and the signals emitted at their outputs are opposed in polarity. Consequently, the signal appearing at the output of the third difference amplifier $V_3$ is, as a function of the direction of the offset of the images, either greater or smaller than zero. An unambiguous identification of the direction is thus possible, i.e. FIGS. 3b and 3c.

The principle explained herein by the example of the edge 1a operates with other structures of the object in a similar manner, provided that the object has any structure at all in the direction of the sectional line. In case of a periodic structure, the lattice constant of such a structure, for reasons that are known, must be larger than or at least equal to one-half of the length of the measured field.

The arrangement described herein provides the additional advantage that it is largely insensitive to fluctuations of overall brightness, since, on both sides, differences in the luminous flux are being processed and thus, fluctuations in said luminous flux which affect the entire receiver range (e.g. alternating light) are extensively eliminated. Further, differences in the sensitivity of the receivers may be equalized within certain limits by adjusting the preamplification, as indicated by the trim resistances $T_1$-$T_3$, because the device operates overall as a zero indicator and the absolute magnitude of the output signals therefore has no significance.

Figure 4:
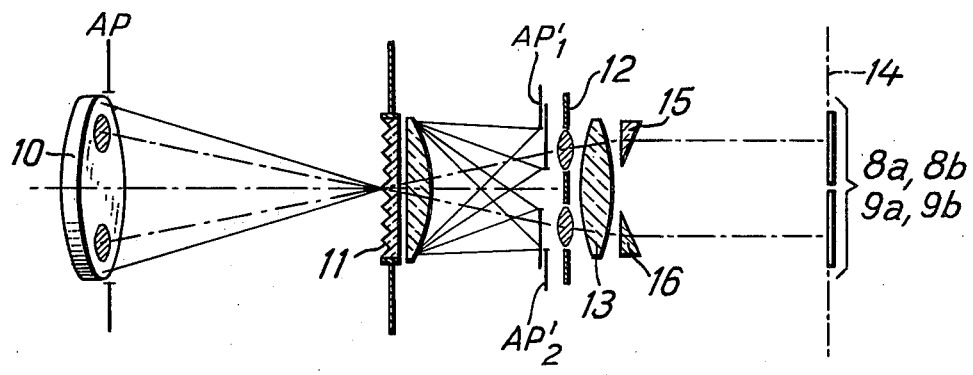
FIG. 4 is a schematic illustration of the invention wherein the two images of the object are produced by means of a prismatic grid.
Figure 5:
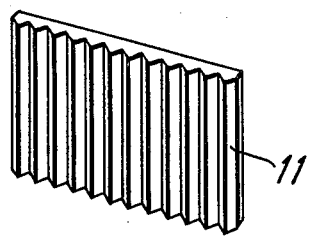
FIG. 5 is a perspective view of the prismatic grid.

FIG. 4 presents a form of embodiment of the device, wherein the two images of the object are generated not by two measuring wedges but by a prismatic raster. This form of embodiment avoids the principal disadvantage of sectional image rangefinding, i.e. that merely closely adjacent but not identical areas of the object are used in the measurements.

The objective lens 10 images an object, not shown, on a prismatic raster plate 11. The mutually inclined flanks of said plate twice reproduce the exit pupil AP of the objective. Two pupil images $AP'_1$ and $AP'_2$ are generated. Of these overlapping pupil images two oppositely located partial areas of the exit pupil are blocked out by means of a diaphragm 12. (A similar diaphragm may also be used in the mode of embodiment of FIG. 1, in order to block out the intermediate areas of the pupil which do not transmit information usable in range finding).

The two partial areas are reproduced in the intercept plane 14 by means of a subsequent optical device 13, the photoelectric receiver pairs 8a, 8b and 9a, 9b being arranged in said intercept plane. The images of the two partial images would superpose upon each other to form a closed image in the intercept plane, if there are no means provided to separate the images. Such means are provided and consist of the wedges 15 and 16, which have their refracting edges parallel to the measuring base and are represented in the figure in positions rotated by 90°. The wedges have the effect that the partial images originating in the two halves of the pupil, are projected onto the photoelectric receivers offset in height, i.e. perpendicularly to the plane of the drawings, with respect to each other. In reality, the receivers 8a, 8b are located in front of the plane of the drawing, while the receivers 9a, 9b are located behind said plane. The adequate narrowing of the two fields of vision may be insured by means of diaphragms behind the auxiliary optical device. However, in such a case a modification of the form of the receivers may be necessary, so that the penumbral areas produced fall between the halves of the receivers.

Figure 6:
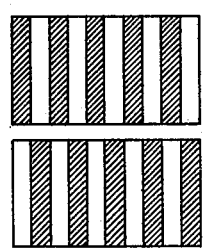
FIG. 6 is a schematic view of the receiver device with the grating image superposed upon it.

FIG. 6 demonstrates that the two partial images behave in a complementary manner with respect to each other, i.e. that they are subdivided into strip-like areas, which are blocked out alternatingly. Both partial images thus appear to be traversed by dark lines parallel to the prismatic raster which, however, does not effect the present operation.

While particular embodiments of the invention have been shown and described, it will be obvious to those skilled in the art that various changes and modifications may be made without departing from the essential features of the present invention and, therefore, the aim in the appended claims is to cover all such changes and modifications as fall within the true spirit and scope of the invention.

I claim:

1. An optical electronic device for focusing as in a photographic camera having an objective optical system producing two split images of the same object the contours of which are laterally offset with respect to each other upon defocusing and a photoelectric receiver device for receiving said offset images, said receiver device comprising a first pair of individual photoelectric receivers (8a, 8b), upon each of which one of the images of the object is incident, said individual receivers having approximately equal receiving areas which uniformly increase laterally from one side to the other, said individual receivers providing electrical output signals and said optical electronic device further comprising means for receiving said electrical output signals.

2. An optical electronic device according to claim 1, wherein said means for receiving said electrical output signals comprises a difference circuit.

3. An optical electronic device according to claim 1 or 2, wherein said receiver device further comprises a second pair of individual photoelectric receivers 9a, 9b) each receiver of said second pair providing additional electrical output signals and said optical electronic device further comprising means for receiving said additional electrical output signals.

4. An optical electronic device according to claim 3 wherein each of said receivers of said second pair has an approximately equal receiving area which uniformly increases laterally from one side to the other in a direction opposite the direction of increase of said first pair of receivers.

5. An optical electronic device according to claim 4 wherein each of said receivers of said first and second pairs are wedge-shaped.

6. An optical electronic device according to claim 5 wherein said first and second pairs of receivers are nested within each other forming an overall rectangular surface configuration.

7. An optical electronic device according to claim 3, including a means for comparing a signal from said means for receiving with a signal from said additional means for receiving.

* * * * *